(12) United States Patent
Byun et al.

(10) Patent No.: US 8,171,190 B2
(45) Date of Patent: May 1, 2012

(54) DIRECT IMAGE FORMATION METHOD AND APPARATUS

(75) Inventors: Hyung-sik Byun, Suwon-si (KR); Jun-Hyung Ha, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1116 days.

(21) Appl. No.: 11/189,045

(22) Filed: Jul. 26, 2005

(65) Prior Publication Data

US 2006/0023253 A1 Feb. 2, 2006

(30) Foreign Application Priority Data

Jul. 27, 2004 (KR) .................. 10-2004-0058793

(51) Int. Cl.
*G06F 13/00* (2006.01)
(52) U.S. Cl. ...................... 710/100; 358/1.15
(58) Field of Classification Search .......... 358/1.1–1.15; 711/115
See application file for complete search history.

(56) References Cited

U.S. PATENT DOCUMENTS

| | | | | |
|---|---|---|---|---|
| 6,085,265 A * | 7/2000 | Kou | ................................. | 710/63 |
| 6,480,304 B1 * | 11/2002 | Os et al. | ........................ | 358/474 |
| 6,535,230 B1 * | 3/2003 | Celik | ............................ | 715/769 |
| 6,587,839 B1 * | 7/2003 | McIntyre et al. | ............... | 705/27 |
| 7,576,779 B2 * | 8/2009 | Tanaka et al. | .............. | 348/211.4 |
| 2003/0225971 A1 | 12/2003 | Oishi et al. | | |
| 2004/0012805 A1 * | 1/2004 | Tojo | ............................ | 358/1.13 |

FOREIGN PATENT DOCUMENTS

| | | |
|---|---|---|
| JP | 11-328079 | 11/1999 |
| JP | 2002-229752 | 8/2002 |
| JP | 2002-287913 | 10/2002 |
| KR | 1020030068887 | 8/2003 |
| KR | 10-2004-0004179 | 1/2004 |
| KR | 102004002681 | 1/2004 |
| KR | 1020040013739 | 2/2004 |
| KR | 1020040016149 | 2/2004 |

OTHER PUBLICATIONS

USB Implementers' Forum, Universal Serial Bus (USB)—Device Class Definition for Human Interface Devices (HID) Version 1.11, Jun. 27, 2001.*

* cited by examiner

*Primary Examiner* — Benny Tieu
*Assistant Examiner* — Michael Tzeng
(74) *Attorney, Agent, or Firm* — Roylance, Abrams, Berdo & Goodman, LLP

(57) ABSTRACT

Provided are a direct image formation method and apparatus in which a predetermined image file that is transmitted from a host computer is directly received and printed or transmitted. The direct image formation method includes setting a USB class of the direct image formation apparatus to a mass storage class (MSC) and connecting the direct image formation apparatus to the host device in an MSC connection mode; transmitting the image file from the host device to the direct image formation apparatus in the MSC connection mode; and converting the image file to data in a predetermined printing format and printing the data into which the image file is converted.

17 Claims, 8 Drawing Sheets

DIRECT IMAGE FORMATION METHOD AND APPARATUS

CROSS-REFERENCE TO RELATED APPLICATION

This application claims the benefit under 35 U.S.C. §119 (a) of Korean Patent Application No. 10-2004-0058793, filed on Jul. 27, 2004, in the Korean Intellectual Property Office, the entire disclosure of which is hereby incorporated by reference.

BACKGROUND OF THE INVENTION

1. Field of the Invention

The present invention relates to an image processing apparatus. More particularly, the present invention relates to a direct image processing method by which an image processing apparatus directly receives a predetermined image file from a host computer and prints or transfers the image file, and an apparatus for performing the same.

2. Description of the Related Art

FIG. 1 is a block diagram of a conventional image printing system. Referring to FIG. 1, the conventional image printing system includes a host computer 10 and an image printing apparatus 100. The host computer 10 is typically connected to the image printing apparatus 100 by a universal serial bus (USB) 50 or the like. The host computer 10 includes an assistant memory unit 14, which stores a driver for driving the image printing apparatus to print image files, a processor unit 12, which converts data of the image files to data in a predetermined printing format according to the driver stored in the assistant memory unit 14, and a USB interface unit 16 for communicating with an image printing apparatus 100.

The image printing apparatus 100 includes a USB interface unit 110 for communicating with the host computer 10, a memory unit 120 for storing image files received from the host computer 10, a data conversion unit 130 converting the received image files to data in a predetermined printing format, a printing engine unit 140 for printing the converted data, and a control unit 150 for controlling the overall operation of the image printing apparatus 100.

FIG. 2 is a flowchart illustrating a conventional method of printing image files with the conventional image printing network of FIG. 1. In order to print an image file, a user selects a predetermined image file and inputs a printing command to print the selected image file via a user interface unit such as a mouse or a keyboard in operation 210. In response to the printing command, the processor 12 retrieves the image printing apparatus driver for driving the image printing apparatus 100 from the assistant memory unit 14 and converts the selected image file to data in a predetermined printing format in operation 220. The converted printing format data is transferred to the image printing apparatus 100 via the USB 50 in operation 230. The transferred printing format data is printed via the printing engine 140 under the control of the control unit 150 in operation 240.

Alternatively, in a conventional fax transferring network, which includes a fax apparatus and a host computer, in order to transfer an image file, a fax apparatus driver stored in the host computer is retrieved and an image file to be transferred is converted to data in a predetermined fax format. The converted fax format data is transferred to the fax apparatus via a USB, and the fax apparatus transfers the transferred fax format transfer data to an external network using transfer information such as a fax number input by a user.

General photograph image printing apparatuses or fax apparatuses include a data conversion unit, which converts image files to be printed or transferred to data in a predetermined print or fax format. Accordingly, a host computer does not require an image printing apparatus driver or a fax apparatus driver for converting image files to data in a printing or a fax format corresponding to the image printing apparatus or the fax apparatus, respectively.

However, time is required to interpret the data in a printing or a fax format that has been converted from an image file using an image printing apparatus or fax apparatus driver in a host computer. Accordingly, the processing of image files in conventional image printing apparatuses or fax apparatuses is slowed.

SUMMARY OF THE INVENTION

The present invention provides a method and apparatus for directly printing a predetermined image file.

The present invention also provides a method and apparatus for directly processing a predetermined image file.

The present invention also provides an image processing method in which a predetermined image file is received from an external network and is directly processed.

According to an aspect of the present invention, there is provided a direct image formation method by which an image is directly formed based on an image file received from a host device in a network where the host device and a direct image formation apparatus are connected to each other via a USB. The direct image formation method comprises the steps of setting a USB class of the direct image formation apparatus to a mass storage class (MSC) and connecting the direct image formation apparatus to the host device in an MSC connection mode; transmitting the image file from the host device to the direct image formation apparatus in the MSC connection mode; and converting the image file to data in a predetermined printing format and printing the data into which the image file is converted.

According to another aspect of the present invention, there is provided a direct image formation apparatus which is connected to a host device via a USB and directly forms an image based on an image file received from the host device. The direct image formation apparatus comprises an MSC control unit which sets a USB class of the direct image formation apparatus to an MSC and sets a connection mode in which the image printing apparatus and the host computer are to be connected to an MSC connection mode; a memory unit which stores the received image file in the MSC connection mode; a data conversion unit which converts the stored image file to data in a predetermined printing format; and a printing engine unit which prints the data in the predetermined printing format.

BRIEF DESCRIPTION OF THE DRAWINGS

The above and other features and advantages of the present invention will become more apparent by describing in detail exemplary embodiments thereof with reference to the attached drawings in which.

It should be understood that throughout the drawings like reference numerals refer to like features, structures and elements.

DETAILED DESCRIPTION OF EXEMPLARY EMBODIMENTS

The present invention will now be described more fully with reference to the accompanying drawings in which exemplary embodiments of the invention are shown.

Figure 1:
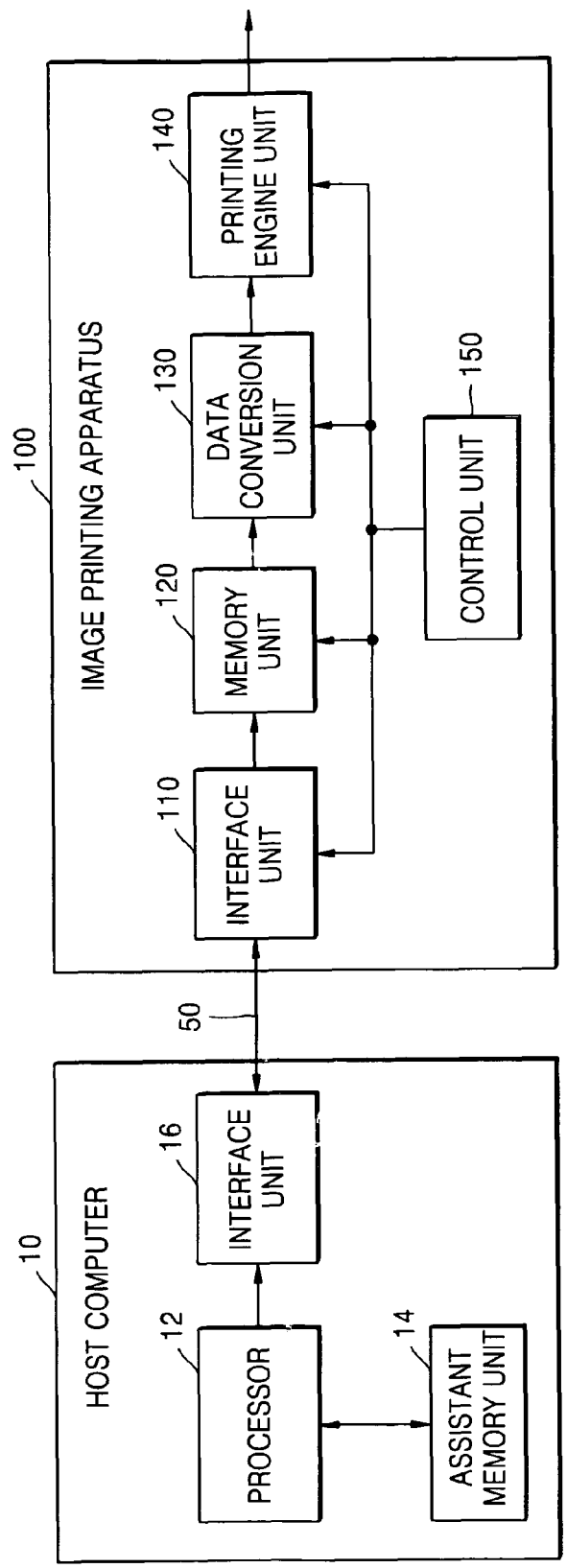
FIG. 1 is a block diagram of a conventional image printing network.
Figure 2:
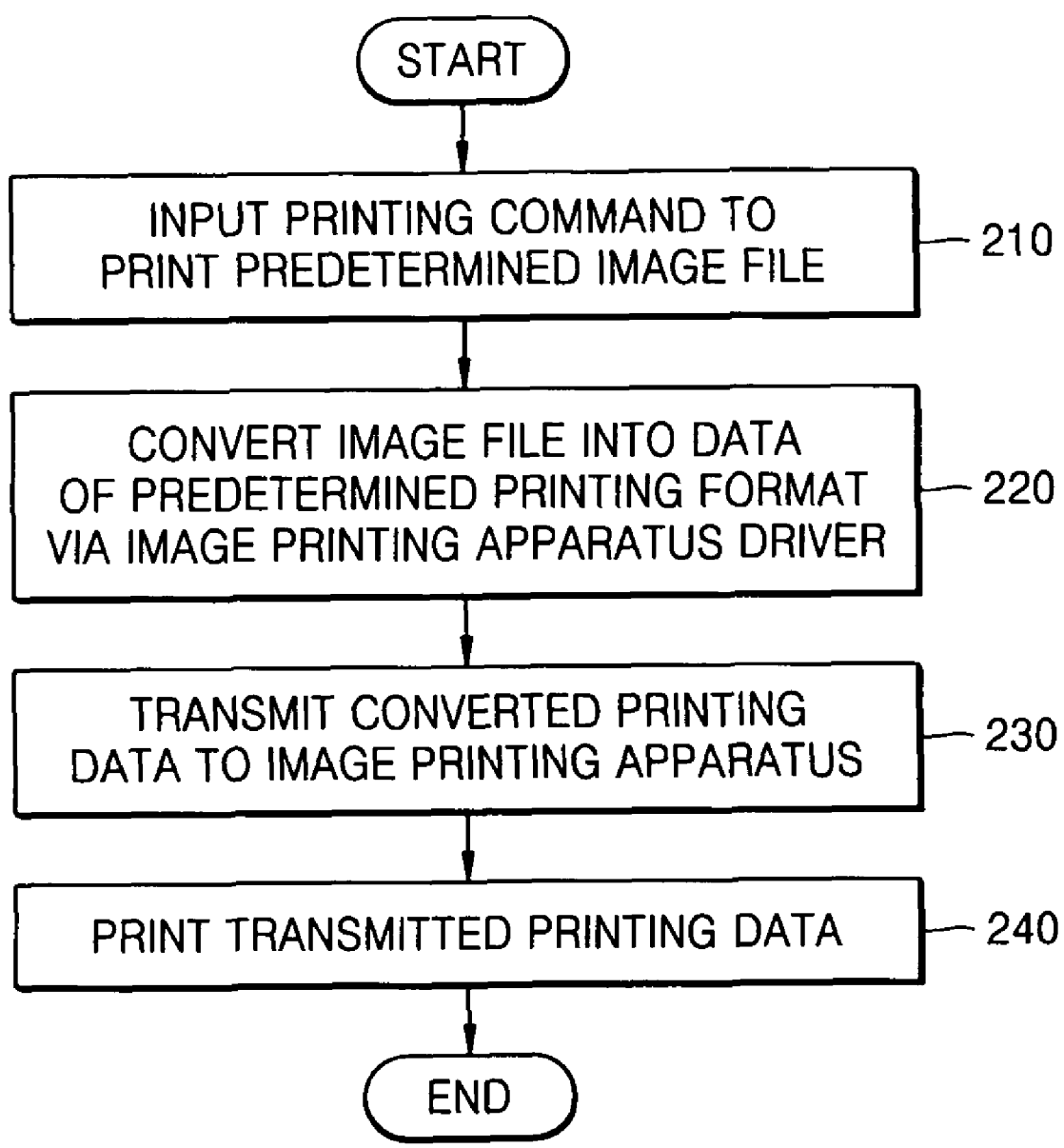
FIG. 2 is a flowchart illustrating a conventional method of printing a predetermined image file with the conventional image printing network shown in FIG. 1.
Figure 3:
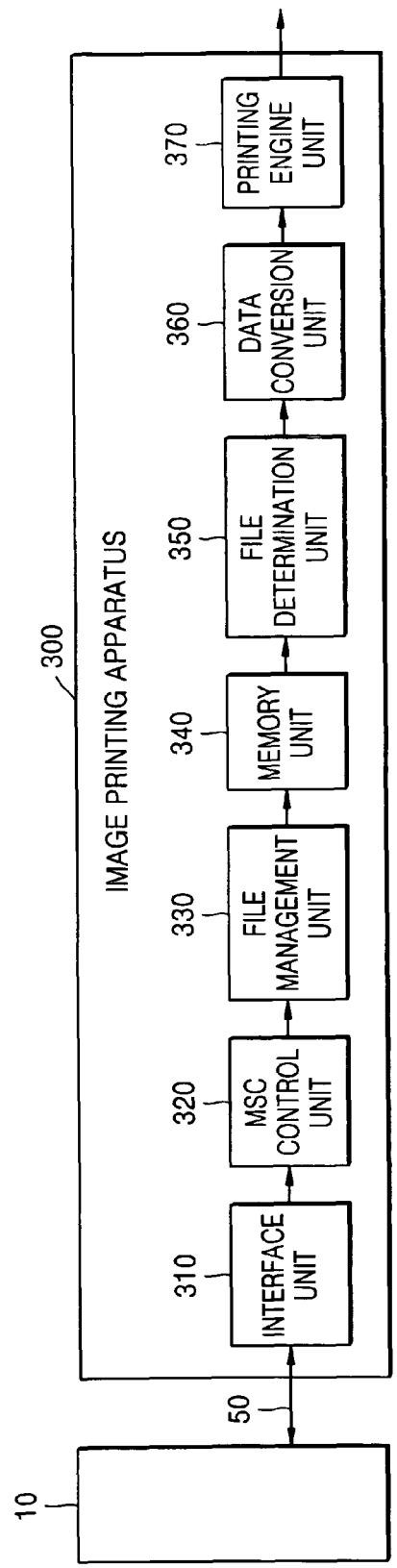
FIG. 3 is a block diagram of a direct image formation apparatus according to an embodiment of the present invention.

FIG. 3 is a block diagram of an example of a direct image formation apparatus according to an embodiment of the present invention, such as the image printing apparatus 300. Referring to FIG. 3, the image printing apparatus 300 comprises an interface unit 310, a mass storage class (MSC) control unit 320, a file management unit 330, a memory 340, a file determination unit 350, a data conversion unit 360, and a printing engine unit 370.

The image printing apparatus 300 is connected to a host computer 10 by a universal serial bus (USB) 50. When the image printing apparatus 300 is connected to the host computer 10 by the USB, the MSC control unit 320 sets a USB class of the image printing apparatus 300 to an MSC. When the USB class of the image printing apparatus 300 is set to the MSC, the host computer 10 recognizes the image printing apparatus 300 as a mass storage media and displays a mobile driver corresponding to the host computer 10 on a browser of a browsing program such as a window browser. Hereinafter, a mode in which the USB class of the image printing apparatus 300 is set to the MSC is referred to as an MSC connection mode.

When the USB class of the image printing apparatus 300 is set to the MSC via the MSC control unit 320 and is connected to the host computer 10, an image file is directly received in the MSC connection mode from the host computer 10 via the interface unit 310. The received image file is stored at an address of the memory 340 designated by the file management unit 330. The file management unit 330 such as a file allocation table (FAT) or a new technology file system (NTFS) writes the received image file to a predetermined address of the memory 340, and reads the image file from the predetermined address of the memory 340.

The file determination unit 350 determines whether an image file received from the host computer 10 can be printed or, in other words, is printable. When the received image file can be printed, the file determination unit 350 provides the image file to the data conversion unit 360. However, when the received image file cannot be printed, the file determination unit 350 deletes the received image file.

The data conversion unit 360 receives the image file from the file determination unit 350 and converts the image file into printing data in a printing format such as a bitmap format. The printing engine unit 370 receives the converted printing format data and prints the image file.

Figure 4:
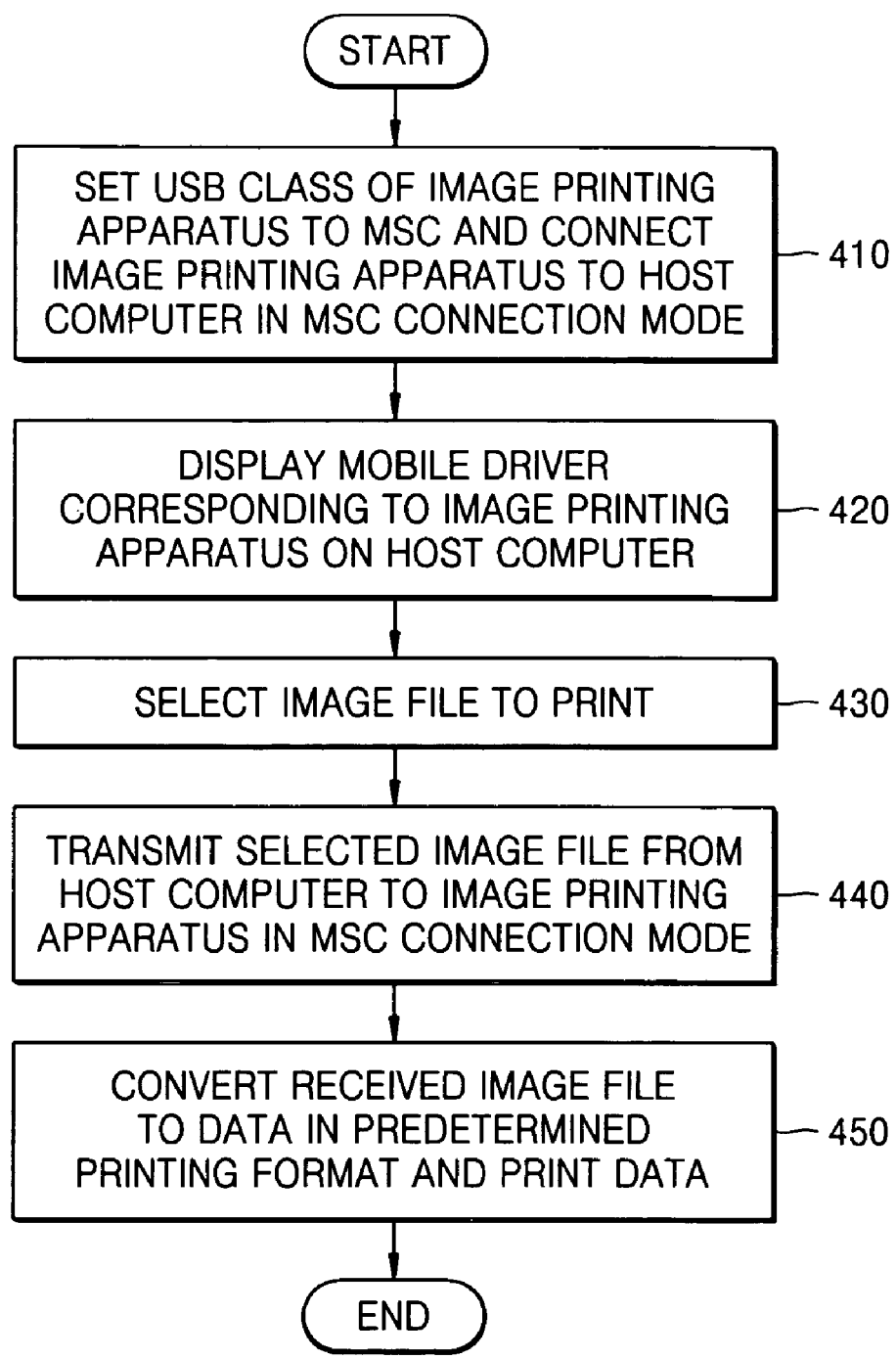
FIG. 4 is a flowchart illustrating a direct image formation method according to an embodiment of the present invention.

FIG. 4 is a flowchart illustrating a direct image formation method performed by the image printing apparatus 300 of FIG. 3 according to an embodiment of the present invention. The direct image formation method performed by the image printing apparatus 300 of FIG. 3 may be an image printing method. Referring to FIG. 4, when the image printing apparatus 300 is connected to the host computer by the USB 50, the USB class of the image printing apparatus 300 is set to the MSC and the image printing apparatus 300 is connected to the host computer 10 in the MSC connection mode in operation 410. When the image printing apparatus 300 is connected to the host computer 10 by the USB 50, the image printing apparatus 300 and the host computer 10 notify each other of what they are doing via the interface units 16 and 310. The image printing apparatus 300 notifies the host computer 10 that the image printing apparatus 300 is a mass storage media server and a client of the host computer 10, and the host computer 10 notifies the image forming apparatus 300 that the host computer 10 is a host computer server and a client of a mass storage media.

When the image printing apparatus 300 is connected to the host computer 10 in the MSC connection mode, a mobile driver corresponding to the image printing apparatus 300 is displayed on a browser of a browsing program such as a window browser in operation 420. A user selects an image file stored in the host computer 10 in operation 430. The selected image file is dragged to the mobile driver displayed on the browser such that the selected image file is transmitted from the host computer 10 to the image printing apparatus 300 in the MSC connection mode in operation 440. The received image file is converted to data in a predetermined printing format, and the data in the printing format is printed via the printing engine unit 370 in operation 450.

Figure 5:
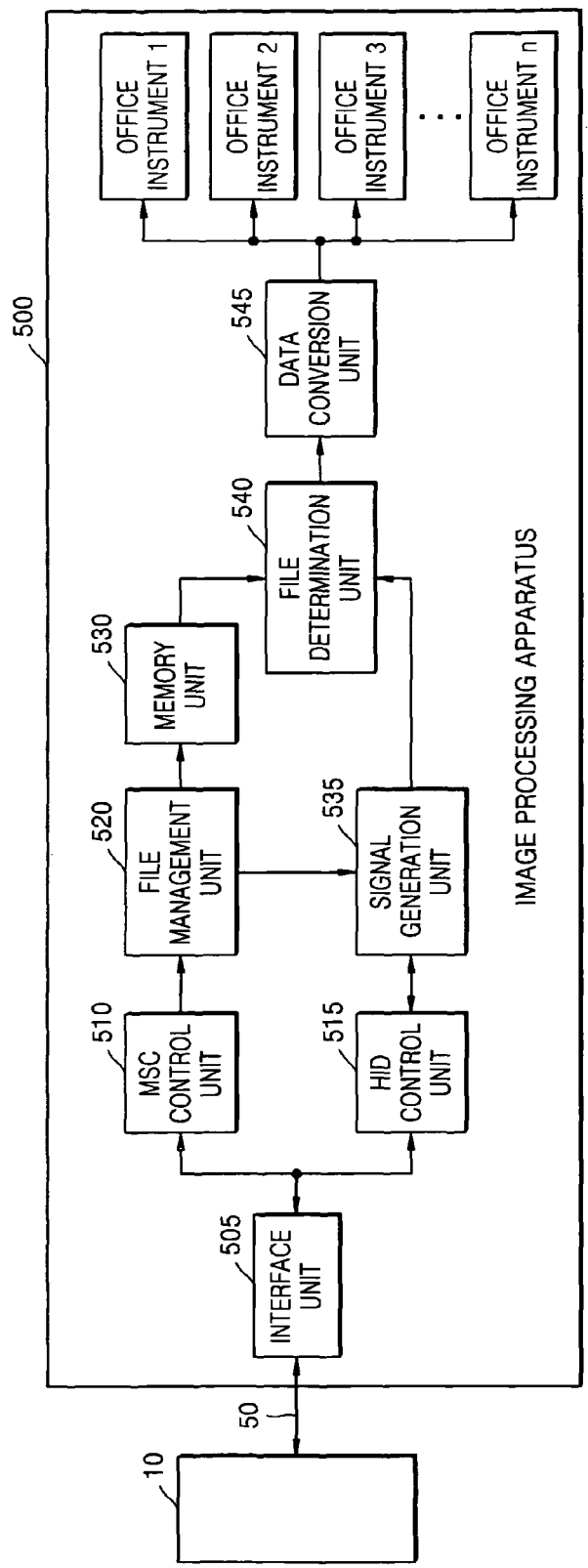
FIG. 5 is a block diagram of a direct image formation apparatus according to another embodiment of the present invention.

FIG. 5 is a block diagram of an example of a direct image formation apparatus according to another embodiment of the present invention, such as an image processing apparatus 500. Referring to FIG. 5, the image processing apparatus 500 is connected to a host computer 10 by a USB 50, and the image processing apparatus 500 includes a plurality of office instruments 1, 2, 3, . . . n, such as a printer, a fax and so forth. The image processing apparatus 500 can comprise different kinds of office instruments according to the environment in which the present invention is applied.

When the image processing apparatus 500 is connected to the host computer 10 by the USB 50, an MSC control unit 510 sets a USB class of the image processing apparatus 500 to an MSC and connects the image processing apparatus 500 and the host computer 10 in the MSC connection mode. Alternatively, a human interface devices (HID) control unit 515 sets a USB class of the image processing apparatus 500 to an HID class. The HID class is a USB class that supports user input devices such as a USB mouse or a USB keyboard. When the USB class of the image processing apparatus 500 is set to the HID class, the host computer 10 recognizes the image processing apparatus 500 as a user input device. A mode in which the image processing apparatus 500 is recognized as a user input device is an HID connection mode.

When the host computer 10 and the image processing apparatus 500 are connected to each other in the MSC connection mode, an image file to be processed by an interface unit 505 is received from the host computer 10 and is stored in a memory unit 530. The file management unit 520 allows the received image file to be stored at a predetermined address of the memory unit 530.

A signal generation unit 535 determines whether an image file is stored in the memory unit 530 via the file management unit 520. When an image file is stored in the memory unit 530, a signal requiring a user selection command for selecting one of the office instrument 1, 2, 3, . . . , n to process the image file is generated and the generated signal is provided to the host computer 10 in the HID connection mode. A file determination unit 540 determines whether the image file stored in the memory unit 530 can be converted to data in a format corresponding to the office instrument selected by the user selection command. When the file determination unit 540 determines that the image file can be converted to data in the format corresponding to the selected office instrument, a data conversion unit 545 converts the image file into data in the format corresponding to the office instrument selected by the user selection command and transmits the converted data to the selected office instrument.

Figure 6:
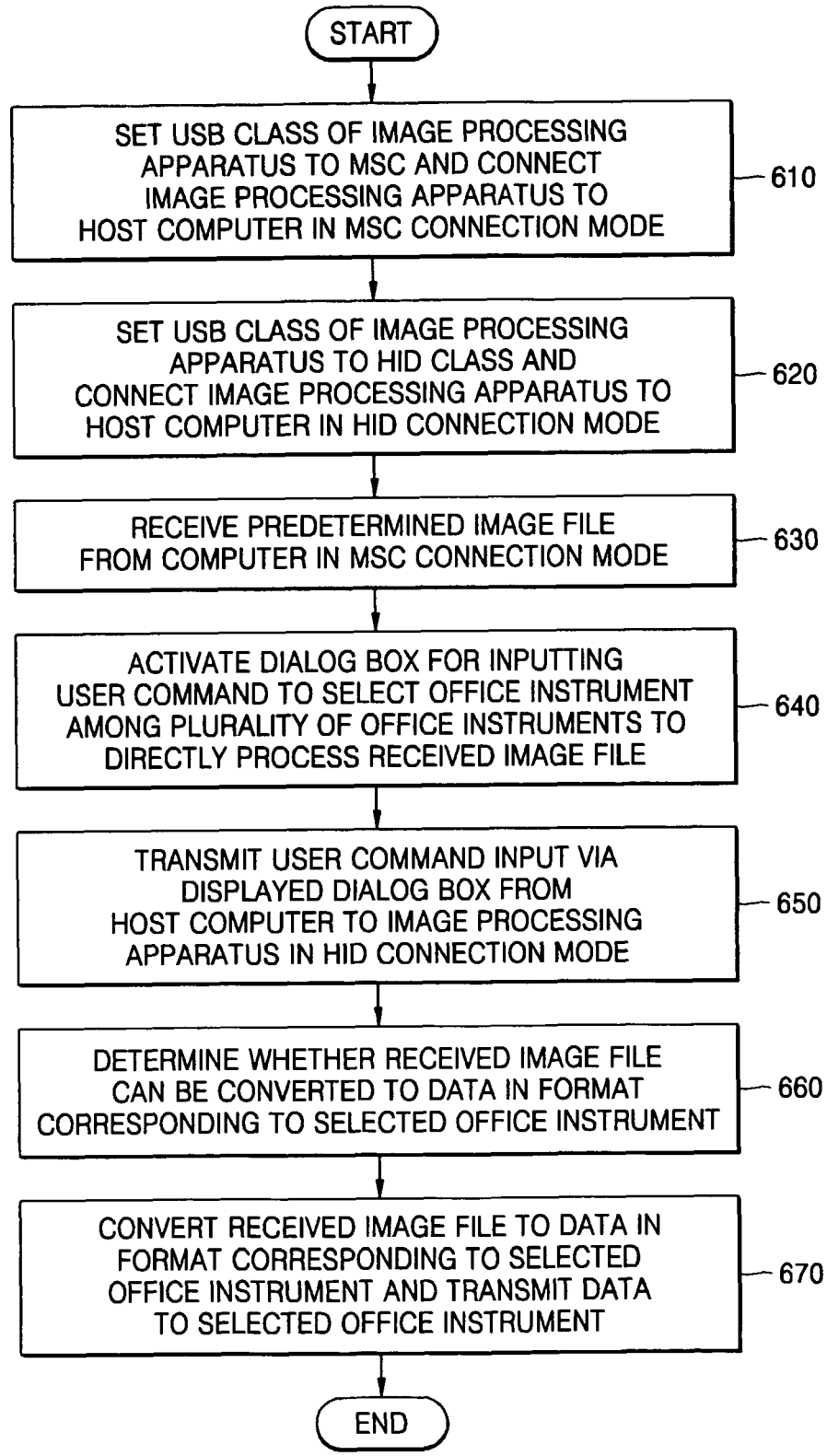
FIG. 6 is a flowchart illustrating a direct image formation method according to another embodiment of the present invention.

FIG. 6 is a flowchart illustrating a direct image formation method performed by to the image processing apparatus 500 of FIG. 5 according to an embodiment of the present invention. The direct image formation method performed by the image processing apparatus 500 of FIG. 5 may be an image processing method. Referring to FIG. 6, when the image processing apparatus 500 is connected to the host computer 10 by the USB 50, the USB class of the image processing is set to the MSC and the image processing apparatus 500 is connected to the host computer 10 in the MSC connection mode in operation 610. On the other hand, when the image processing apparatus 500 is connected to the host computer 10 by the USB 50, the USB class of the image processing apparatus 500 is set to the HID class and the image processing apparatus 500 is connected to the host computer 10 in the HID connection mode in operation 620.

The image processing apparatus 500 receives an image file to be processed from the host computer 10 in the MSC connection mode in operation 630. When the image processing apparatus 500 is connected to the host computer 10 in the MSC connection mode, a mobile driver corresponding to the image processing apparatus 500 is displayed on a browser of a browsing program, such as a window browser. A user selects a predetermined image file stored in the host computer 10 using the browser and drags the selected image file to the mobile driver displayed on the browser. The selected image file is transmitted from the host computer 10 to the image processing apparatus 500 in the MSC connection mode.

When the image file to be processed is received and stored in the memory unit 530, a dialog box for inputting a user selection command to select an office instrument to directly process the received image file from among a plurality of office instruments is displayed in operation 640. When it is determined by the file management unit 520 that the image file is stored in the memory unit 530, a signal, which requests the user selection command to process the received image file, is generated and is transmitted to the host computer 10 in the HID connection mode. The host computer 10 receives the signal requiring the user selection command and activates a dialog box in which the user inputs a selection command to select the office instrument for processing the received image file.

The user selection command input via the displayed dialog box is transmitted from the host computer 10 to the image processing apparatus 500 in the HID connection mode in operation 650. The user inputs the user selection command via the displayed dialog box to select the office instrument from among a plurality of the office instruments for processing the image file, and the input user selection command is transmitted to the image processing apparatus 500 in the HID connection mode.

It is then determined whether the received image file is an image file that can be converted to data in a format corresponding to the selected office instrument in operation 660. When the received image file cannot be converted to data in the format corresponding to the selected office instrument, the received image file is deleted.

When it is determined that the received image file can be converted to data in the format corresponding to the selected office instrument, the received image file is converted to data in the format corresponding to the selected office instrument, and the converted data is transmitted to the selected office instrument in operation 670. The selected office instrument receives the converted data and processes the data.

Figure 7:
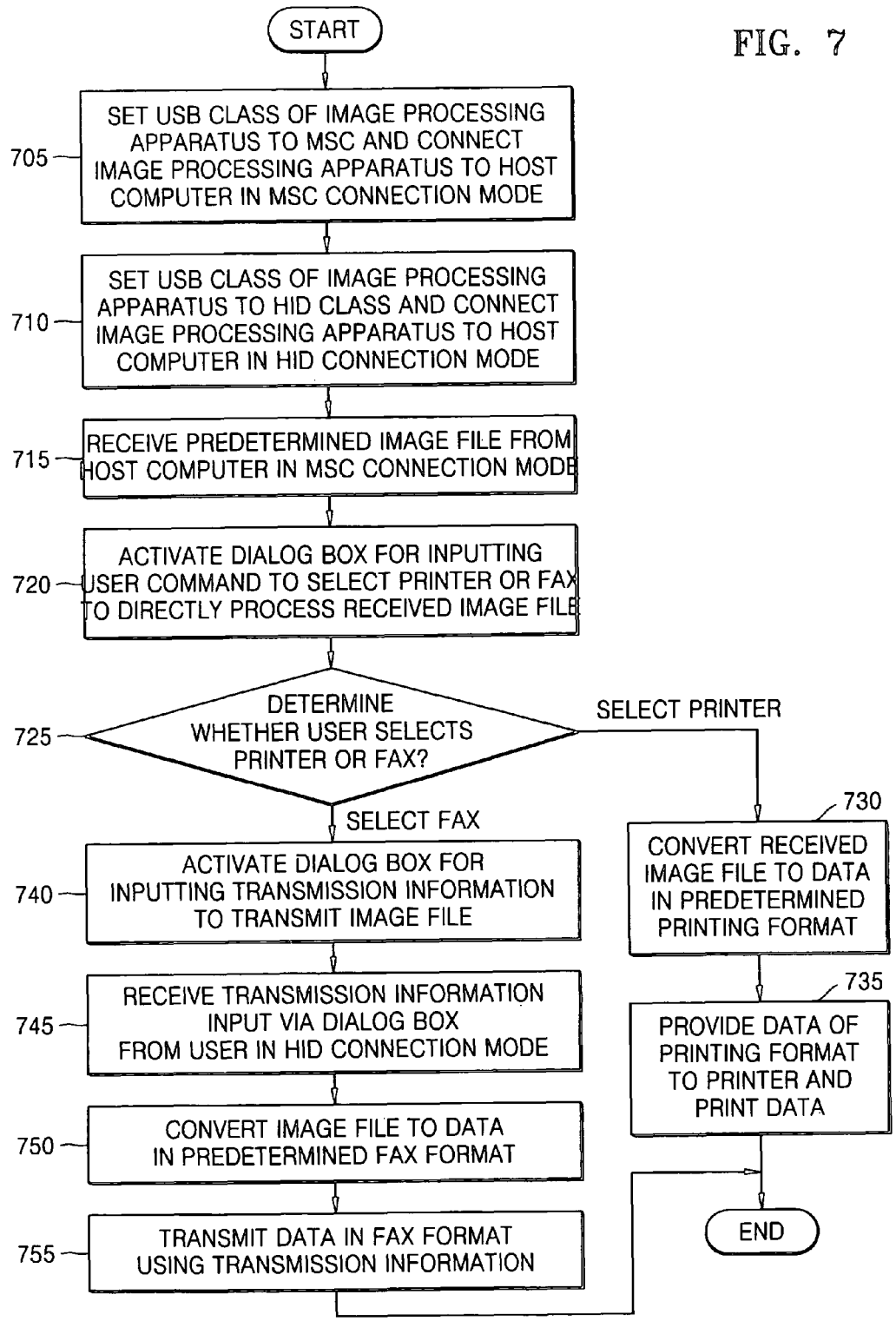
FIG. 7 is a flowchart illustrating a direct image formation method performed by a direct image formation apparatus including a printer and fax.

FIG. 7 is a flowchart illustrating an image processing method implemented by an image processing apparatus including a printer and fax according to an embodiment of the present invention. A USB class of the image processing apparatus is set to the MSC, and the image processing apparatus is connected to the host computer 10 in an MSC connection mode in operation 705. The USB class of the image processing apparatus is set to the HID class, and the image processing apparatus is connected to the host computer 10 in the HID connection mode in operation 710. A predetermined image file is received from the host computer 10 in the MSC connection mode in operation 715. A dialog box in which a user inputs a user selection command to select the printer or the fax function to directly process the received image file is displayed in operation 720. The operations described above are similar to the operations 610 through 640 of FIG. 6, respectively.

Whether the user selects the printer or the fax via the displayed dialog box is determined in operation 725. When the user selects the printer to print the received image file in operation 725, the received image file is converted to data in a predetermined printing format in operation 730. The data in the printing format is printed via a printing engine unit (not shown) of the printer in operation 735.

Alternatively, when the user selects the fax to transmit the received image file in operation 725, a dialog box in which transmission information required to transmit the received image file is input by the user is displayed in operation 740. The transmission information input via the displayed dialog box is transmitted to the image processing apparatus in the HID connection mode in operation 745. The received image file is converted to data in a predetermined fax format in operation 750. The data in the fax format is transmitted using the transmission information in operation 755.

Figure 8:
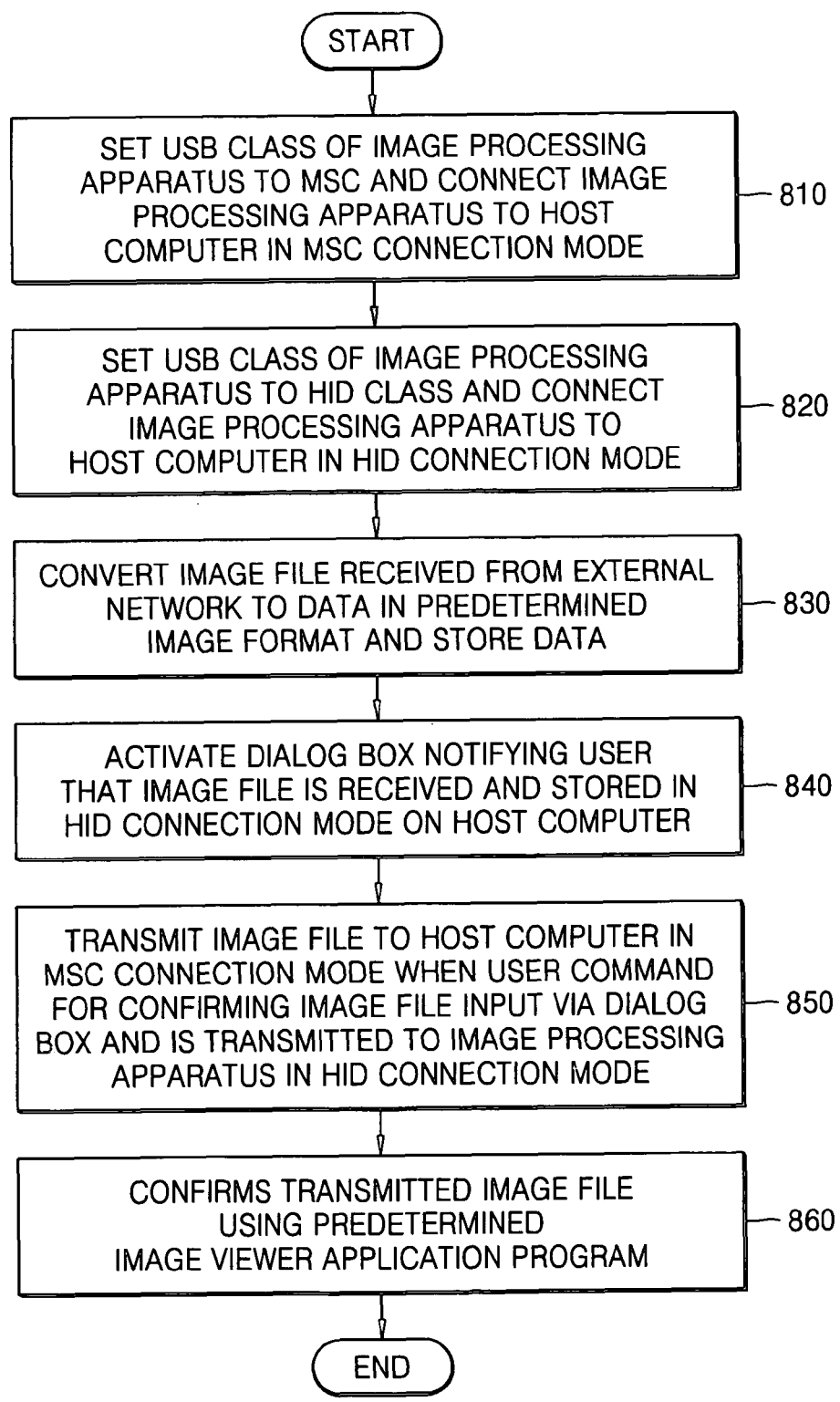
FIG. 8 is a flowchart illustrating a method of receiving a file from an external network and directly processing the received file.

FIG. 8 is a flowchart illustrating a method of receiving a file from an external network and directly processing the received file, which is performed by the image processing apparatus 500 of FIG. 5. Referring to FIG. 8, operations 810 and 820 are identical to operations 610 and 620 of FIG. 6. In more detail, in operation 810, a USB class of the image processing apparatus 500 of FIG. 5 is set to an MSC, and then the image processing apparatus 500 of FIG. 5 is connected to the host computer 10 in an MSC connection mode. In operation 820, the USB class of the image processing apparatus 500 of FIG. 5 is set to an HID class, and the image processing apparatus 500 of FIG. 5 is connected to the host computer 10 in an HID connection mode.

In operation 830, a predetermined image file is received from an external network, and the received image file is converted to data in an image format and is stored. The external network is preferably equipped with a component which can transmit files such as a fax, a cellular phone, or a PDA, and the image processing apparatus 500 of FIG. 5 preferably includes an office instrument, such as a fax, which can receives files transmitted from the external network.

In operation 840, a dialog box for notifying the user that the image file is received from the external network is displayed. When an image file is received from the external network and stored, a signal to notify the user that an image file is received is generated and transmitted to the host computer 10 in the HID connection mode. The host computer 10, which receives the signal, activates a dialog box in which a user confirmation command to notify the user that the received image file is stored in HID connection mode on the host computer 10. In operation 850, when the user confirmation command is input to the displayed dialog box and transmitted to the image processing apparatus 500 in the HID connection mode, the data in the image format is transmitted to the host computer 10 in the MSC connection mode. The user confirms the transmitted data in the image format in the host computer 10 via a predetermined image viewer application program in operation 860.

In the direct image formation method and the apparatus according to an embodiment of the present invention, since the direct image formation apparatus is connected to a host computer in the MSC connection mode, a predetermined image file stored in the host computer can be directly transmitted to the direct image formation apparatus to be processed. Accordingly, since image files stored in the host computer are copied in a driver corresponding to the direct image formation apparatus using a window browser, without a driver for driving a printer or a fax, the image files are simply processed.

Also, since a predetermined image file of a host computer is directly converted in a data conversion unit of the direct image formation apparatus to be processed, the image file is processed quickly.

The embodiments of the present invention can be written as computer programs and can be implemented in general-use digital computers that execute the programs using a computer readable recording medium. Examples of the computer readable recording medium include magnetic storage media (such as ROM, floppy disks, hard disks, and the like), optical recording media (such as CD-ROMs, or DVDs), and storage media such as carrier waves (such as transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A direct image formation method by which an image is directly formed based on an image file received from a host device in a network where the host device and a direct image formation apparatus are connected to each other via a USB, the direct image formation method comprising the operations of:
    setting a USB class of the direct image formation apparatus to a mass storage class (MSC) and connecting the direct image formation apparatus to the host device in an MSC connection mode;
    transmitting the image file from the host device to the direct image formation apparatus in the MSC connection mode;
    determining whether the image file is printable; and
    converting the image file to data in a predetermined printing format and printing the data into which the image file is converted, if the image file is printable,
    wherein the transmitting the image file comprises:
        displaying a mobile driver corresponding to the direct image formation apparatus on the host device;
        selecting the image file; and
        transferring or copying the selected image file to the displayed mobile driver.

2. A direct image formation apparatus which is connected to a host device via a USB and directly forms an image based on an image file received from the host device, the direct image formation apparatus comprising:
    an MSC control unit which sets a USB class of the direct image formation apparatus to an MSC and sets a connection mode in which the image printing apparatus and the host computer are to be connected to an MSC connection mode;
    a memory unit which stores the received image file in the MSC connection mode;
    a data conversion unit which converts the stored image file to data in a predetermined printing format;
    a printing engine unit which prints the data in the predetermined printing format;
    an image file determination unit which determines whether the image file stored in the memory unit is a printable image file and provides the image file stored in the memory unit to the data conversion unit if the image file stored in the memory unit is determined to be a printable image file; and
    an interface unit which communicates with a mobile driver on the host device, wherein the mobile driver corresponds to the direct image formation apparatus.

3. The direct image formation apparatus of claim 2 further comprising:
    an interface unit which communicates with the host device; and
    a file management unit which manages the image file stored in the memory unit.

4. A direct image formation method by which an image is directly formed based on an image file received from a host device in a network where the host device and a direct image formation apparatus having one or more functions are connected to each other via a USB, the direct image formation method comprising the operations of:
    setting a USB class of the direct image formation apparatus to an MSC, such that the host device recognizes the direct image formation apparatus as a mass storage media and the host device is a client of the mass storage media, and connecting the direct image formation apparatus to the host device in an MSC connection mode;
    setting the USB class of the direct image formation apparatus to an HID class and connecting the direct image formation apparatus to the host device in an HID connection mode;
    transmitting the image file from the host device to the direct image formation apparatus;
    selecting a direct image processing function, which is one of the functions provided by the direct image formation apparatus and enables the image file to be directly processed; and
    converting the image file to data in a format corresponding to the selected direct image processing function and forming an image based on the data in the format corresponding to the selected direct image processing function by performing the selected direct image processing function, wherein the transmitting the image file comprises:
  displaying a mobile driver corresponding to the direct image formation apparatus on the host device;
  selecting the image file; and
  transferring or copying the selected image file to the displayed mobile driver.

5. The direct image formation method of claim 4, wherein the selecting operation comprises the operations of:
  activating a dialog box for choosing the direct image processing function; and
  allowing the host device to notify the direct image formation apparatus in the HID connection mode that the direct image processing function has been chosen from the activated dialog box.

6. The direct image formation method of claim 5 further comprising, between performing the selecting operation and the converting operation the operations of:
  activating a dialog box in which transmission information necessary to transmit the image file can be input by a user; and
  receiving the transmission information input by the user in the HID connection mode, if the functions provided by the direct image formation apparatus comprise the fax function.

7. The direct image formation method of claim 6, wherein the converting operation comprises the operations of:
  converting the image file into data in a predetermined fax format; and
  transmitting the data in the predetermined fax format from the host device to the direct image formation apparatus using the received transmission information.

8. The direct image formation method of claim 4, wherein the functions provided by the direct image formation apparatus comprise at least one of a print function, a fax function, and a scan function.

9. A computer readable recording medium comprising a program for executing a direct image formation method by a computer, the method comprising the operations of:
  setting a USB class of the direct image formation apparatus to an MSC, such that the host device recognizes the direct image formation apparatus as a mass storage media and the host device is a client of the mass storage media, and connecting the direct image formation apparatus to a host device in an MSC connection mode;
  setting the USB class of the direct image formation apparatus to an HID class and connecting the direct image formation apparatus to the host device in an HID connection mode;
  transmitting the image file from the host device to the direct image formation apparatus;
  selecting a direct image processing function, which is one of the functions provided by the direct image formation apparatus and enables the image file to be directly processed; and
  converting the image file to data in a format corresponding to the selected direct image processing function and forming an image based on the data in the format corresponding to the selected direct image processing function by performing the selected direct image processing function,
  wherein the transmitting the image file comprises:
    displaying a mobile driver corresponding to the direct image formation apparatus on the host device;
    selecting the image file; and
    transferring or copying the selected image file to the displayed mobile driver.

10. A direct image formation apparatus that is connected to a host device via a USB and provides one or more functions, the direct image formation apparatus comprising:
  an MSC control unit which sets a USB class of the direct image formation apparatus to an MSC, such that the host device recognizes the direct image formation apparatus as a mass storage media and the host device is a client of the mass storage media, and sets a connection mode in which the direct image formation apparatus and the host device are to be connected to an MSC connection mode;
  an HID control unit which sets the USB class of the direct image formation apparatus to an HID class and sets the connection mode in which the direct image formation apparatus and the host device are to be connected to an HID connection mode;
  a memory unit which stores the image file received from the host device in the MSC connection mode;
  a file management unit which manages the image file stored in the memory unit;
  a signal generation unit which generates a user selection command request signal requesting a user to choose one of the functions to process the image file and provides the user selection command request signal to the host device in the HID connection mode;
  a data conversion unit which receives a user selection command corresponding to the user selection command request signal from the host device in the HID connection mode and converts the image file to data in a format compatible with the function chosen by the user in response to the received user selection command; and
  an interface unit which communicates with a mobile driver on the host device, wherein the mobile driver corresponds to the direct image formation apparatus.

11. The direct image formation apparatus of claim 10 further comprising an interface unit which enables the direct image formation apparatus and the host device to communicate with each other.

12. The direct image formation apparatus of claim 10, wherein the functions provided by the direct image formation apparatus comprise at least one of a print function, a fax function, and a scan function.

13. The direct image formation apparatus of claim 10 further comprising, if the print function is chosen by the user, an image file determination unit, which determines whether the image file stored in the memory unit is a printable image file, provides the image file stored in the memory unit to the data conversion unit if the image file stored in the memory unit is determined to be a printable image file, and deletes the image file stored in the memory unit if the image file stored in the memory unit is determined not to be a printable image file.

14. The direct image formation apparatus of claim 10 further comprising, if the function chosen by the user is the fax function, an image file determination unit, which determines whether the image file stored in the memory unit is a transmittable image file, provides the image file stored in the memory unit to the data conversion unit if the image file stored in the memory unit is determined to be a transmittable image file, and deletes the image file stored in the memory unit if the image file stored in the memory unit is determined not to be a transmittable image file.

15. A direct image formation method by which an image is directly formed in a network where a direct image formation apparatus having a predetermined function and a host device are connected to each other via a USB based on a file received from an external network, the direct image formation method comprising the operations of:

setting a USB class of the direct image formation apparatus to an MSC, such that the host device recognizes the direct image formation apparatus as a mass storage media and the host device is a client of the mass storage media, and connecting the direct image formation apparatus to the host device in an MSC connection mode;

setting a USB class of the direct image formation apparatus to an HID class and connecting the direct image formation apparatus to the host device in an HID connection mode;

converting the received file to data in a predetermined image format and storing the data in the predetermined format;

enabling the host device to activate a dialog box for notifying a user in the HID connection mode that the file is stored; and transmitting the data in the image format to the host device in the MSC connection mode when the direct image formation apparatus receives, in the HID connection mode, a user confirmation command input by the user via the dialog box, the user confirmation command being used for checking out the data in the image format.

16. The direct image formation method of claim 15 further comprising the operation of displaying the data in the image format on the host device.

17. The direct image formation method of claim 15, wherein the predetermined function provided by the direct image formation apparatus is a fax function.

* * * * *